(12) United States Patent
Chen et al.

(10) Patent No.: US 10,804,779 B2
(45) Date of Patent: Oct. 13, 2020

(54) MULTI-ROTOR PERMANENT MAGNET SYNCHRONOUS MOTOR

(71) Applicant: GAM SHINE TECHNOLOGY CO., LIMITED, Hongkong (CN)

(72) Inventors: Kenny Chen, Shenzhen (CN); Huiming Zhang, Shenzhen (CN)

(73) Assignee: GAM SHINE TECHNOLOGY CO., LIMITED, Hong Kong (CN)

( * ) Notice: Subject to any disclaimer, the term of this patent is extended or adjusted under 35 U.S.C. 154(b) by 380 days.

(21) Appl. No.: 15/737,315

(22) PCT Filed: Jun. 24, 2015

(86) PCT No.: PCT/CN2015/082170
§ 371 (c)(1),
(2) Date: Dec. 18, 2017

(87) PCT Pub. No.: WO2016/201712
PCT Pub. Date: Dec. 22, 2016

(65) Prior Publication Data
US 2018/0175711 A1    Jun. 21, 2018

(30) Foreign Application Priority Data

Jun. 18, 2015 (CN) .......................... 2015 1 0342137

(51) Int. Cl.
| | |
|---|---|
| *H02K 16/00* | (2006.01) |
| *H02K 16/02* | (2006.01) |
| *H02K 21/00* | (2006.01) |
| *H02K 1/22* | (2006.01) |
| *H02K 21/02* | (2006.01) |
| *H02K 23/44* | (2006.01) |
| *H02K 7/08* | (2006.01) |

(52) U.S. Cl.
CPC ............... *H02K 16/02* (2013.01); *H02K 1/22* (2013.01); *H02K 21/00* (2013.01); *H02K 21/02* (2013.01); *H02K 23/44* (2013.01); *H02K 7/08* (2013.01)

(58) Field of Classification Search
CPC ........ H02K 16/00; H02K 16/02; H02K 19/38; H02K 7/08
See application file for complete search history.

(56) References Cited

U.S. PATENT DOCUMENTS

| | | | | |
|---|---|---|---|---|
| 2,251,505 | A | * 8/1941 | Stephenson | ............ H02K 25/00 310/46 |
| 3,463,954 | A | * 8/1969 | Latta | .................... H02K 5/1672 310/90 |

(Continued)

*Primary Examiner* — Dang D Le

(57) ABSTRACT

The present invention provides a multi-rotor permanent magnet synchronous motor, wherein the motor (100) includes a motor shaft (3) and the main mechanism (1) and the auxiliary mechanism (4) sleeved on the motor shaft (3) in turn which work in parallel; the auxiliary mechanism (4) includes a one-way bearing body (41) sleeved on the motor shaft (3) and auxiliary rotor components (40) sleeved on the one-way bearing body (41). The multi-rotor permanent magnet synchronous motor in the present invention does not need a gear box to drive, and the energy consumption is low. Besides, through the coordinative work of the main structure and the auxiliary mechanism, different torques can be output, so as to output different speeds.

9 Claims, 6 Drawing Sheets

(56) References Cited

U.S. PATENT DOCUMENTS

| | | | | |
|---|---|---|---|---|
| 6,121,705 A | * | 9/2000 | Hoong | H02K 16/02 310/103 |
| 7,615,903 B2 | * | 11/2009 | Holmes | H02K 7/085 310/113 |
| 2008/0252164 A1 | * | 10/2008 | Huang | H02K 7/108 310/112 |

* cited by examiner

MULTI-ROTOR PERMANENT MAGNET SYNCHRONOUS MOTOR

TECHNICAL FIELD

The present invention relates to a kind of motor, more specifically a kind of multi-rotor permanent magnet synchronous motor.

BACKGROUND OF THE INVENTION

There are many kinds of motors and driving modes currently applied on the market. Several commonly-used motors and driving modes are applied in electric vehicles as the driving equipments, such as permanent magnet synchronous motor, asynchronous motor, DC motor and switch reluctance motor. There are also several driving modes, such as automatic MT gear box, manual gear box, CVT stepless speed change gear box and electric speed change gear box. However, in the above motors, no matter which motor is used, as long as it is equipped with the above gear box or not equipped with the above gear box in the direct drive mode, it can cause energy loss, which is the energy loss during energy transmission. The motor uses the gear box to transmit power, which is a kind of energy loss itself. Because when starting an electric car needs a big torque and a high speed to pass the gear of the gear box and the final drive differential lock of the car, and finally transmit to the wheels to drive the car. In the direct drive mode of motor, although no gear box is used, a high power and a big torque are used to drive. Thus, energy consumption and costs of the motor itself are correspondingly higher, while electric car batteries with a large capacity are required to cope with the current intensity and impact when the high-power motor starts. The large-capacity batteries increase the weight of the car body, and also increase the risks.

SUMMARY OF THE INVENTION

The technical problem to be solved by the present invention is to provide a kind of multi-rotor permanent magnet synchronous motor for the defects of motor and its driving mode in the existing technology. The motor does not need a gear box to drive, and the energy consumption is small.

The technical proposal for solving the above problems in the present invention is to provide a kind of multi-rotor permanent magnet synchronous motor, wherein the said motor comprises a motor shaft and the main mechanism and the auxiliary mechanism sleeved on the said motor shaft in turn which work in parallel.

The said auxiliary mechanism comprises a one-way bearing body sleeved on the said motor shaft and auxiliary rotor components sleeved on the said one-way bearing body.

In the above multi-rotor permanent magnet synchronous motor, the said auxiliary rotor components comprise the first auxiliary rotor and the second auxiliary rotor, and the said first auxiliary rotor and the said second auxiliary rotor are sleeved on the opposite ends of the said one-way bearing body, respectively.

In the above multi-rotor permanent magnet synchronous motor, the said one-way bearing body comprises several one-way bearings, inner sleeves of one-way bearings and outer sleeves of one-way bearings; the said inner sleeves of one-way bearings are sleeved on the said motor shaft. At one end of the said inner sleeve of one-way bearing, there are two parallel one-way bearings, and at the other end there are two parallel one-way bearings. The said outer sleeve of one-way bearing surrounds several one-way bearings and the whole part composed by the said inner sleeve of one-way bearing.

In the above multi-rotor permanent magnet synchronous motor, the said first auxiliary rotor and the second auxiliary rotor comprise the cylindrical main body with a hollow structure and an axial end face opening and the cylindrical connecting part in the center of the main body.

At the inner edge of the said connecting part, several concave ribs are set. Each said concave rib is evenly distributed along the axis of the said connecting part circumferentially at equal interval.

In the said multi-rotor permanent magnet synchronous motor, the said first auxiliary rotor and the second auxiliary rotor both comprise the second permanent magnet group, the said second permanent magnet group comprises several second permanent magnets set in the said main body and constituting the axial end face of the opening of the said main body, each of the second permanent magnet is evenly distributed along the axis of the said main body circumferentially at equal interval, and the two adjacent second permanent magnets have different magnetic poles.

In the above multi-rotor permanent magnet synchronous motor, the said auxiliary rotor components also comprise a fixing sleeve used for fixing the said first auxiliary rotor and the said second auxiliary rotor; the said fixing sleeve is on the said one-way bearing body; the said first auxiliary rotor and the said second auxiliary rotor are connected to the opposite ends of the said fixing sleeve respectively; and the axial end face of the opening of the said main body composed of the second permanent magnet of the said first auxiliary rotor is opposite to the axial end face of the opening of the said main body composed of the second permanent magnet of the said second auxiliary rotor.

In the above multi-rotor permanent magnet synchronous motor, the said second permanent magnet is fan-shaped and tile-shaped.

In the above multi-rotor permanent magnet synchronous motor, the said auxiliary rotor components also comprise a top ring for fixing the said one-way bearing body, and the said top ring is sleeved on the motor shaft and arranged in parallel with the said one-way bearing body along the axis of the said motor shaft.

In the above multi-rotor permanent magnet synchronous motor, the said auxiliary mechanism also comprises auxiliary stator components sleeved on the said motor shaft and hex nuts used for fixing the said auxiliary stator components; the said auxiliary stator components comprise a rotary transformer silicon steel sheet, an auxiliary stator sleeved on the said rotary transformer silicon steel sheet and a rotary transformer coil seat sleeved on the said auxiliary stator; the said rotary transformer silicon steel sheet is sleeved on the said motor shaft; and the said hex nuts are sleeved on the tail end of the said motor shaft, and arranged in parallel with the said stator components along the axis of the said motor shaft.

In the above multi-rotor permanent magnet synchronous motor, the said main mechanism comprises a main rotor and a main stator surrounding the said main rotor; the said main rotor comprises an iron core and the first permanent magnet group, the said iron core is provided with several magnetic slots, each magnetic slot is evenly distributed along the axis of the said iron core circumferentially at equal interval, the said first permanent magnet group comprises several first permanent magnets on several magnetic slots installed on the said iron core, and the two adjacent first permanent magnets have different magnetic poles.

Through the collaborative work of the main mechanism and the auxiliary mechanism, the multi-rotor permanent magnet synchronous motor in the present invention produces a big torque to push the car more smoothly and powerfully. It means that the motor with a gear box pushes the car by increasing the speed ratio of the gear box, so that driving is realized without a gear box and the energy consumption is small. In addition, through the coordinative work of the main mechanism and the auxiliary mechanism, different torques can be output, so as to output different speeds.

The motor with a gear box pushes the car by increasing the speed ratio of the gear box, so that driving is realized without a gear box and the energy consumption is small. In addition, through the coordinative work of the main mechanism and the auxiliary mechanism, different torques can be output, so as to output different speeds.

DETAILED DESCRIPTION OF THE INVENTION

The present invention provides a kind of multi-rotor permanent magnet synchronous motor, which can be applied to an electric vehicle. Through the collaborative work of the main mechanism and the auxiliary mechanism, the motor produces a big torque to push the car more smoothly and powerfully. It means that the motor with a gear box pushes the car by increasing the speed ratio of the gear box. At the same time, relative to increase of the speed ratio of the gear box, when the same torque is output, the multi-rotor permanent magnet synchronous motor in the present invention has a small energy consumption, because when the electric car reaches a certain speed the auxiliary mechanism stops working. In addition, through the coordinative work of the main mechanism and the auxiliary mechanism, different torques can be output, so as to output different speeds.

In order to make the purpose, technical scheme and advantages of the present invention clearer, next combined with the drawings and embodiments the present invention will be further explained in details. It should be understood that the specific embodiments described here are used only to explain the present invention, but not to limit it.

Figure 1:
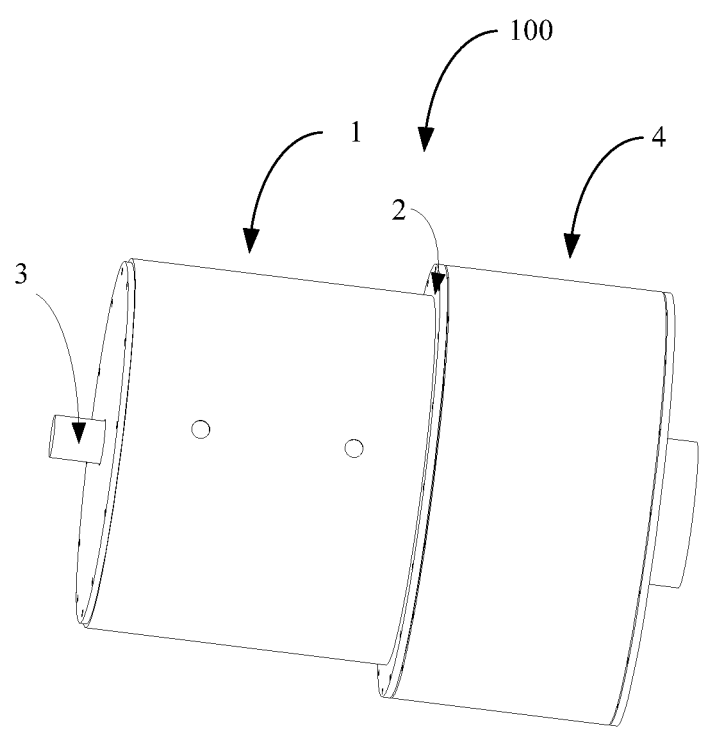
FIG. 1 illustrates a schematic view of the stereoscopic structure of the multi-rotor permanent magnet synchronous motor in a preferred embodiment of the present invention.

FIG. 1 illustrates a schematic diagram of the stereoscopic structure of a multi-rotor permanent magnet synchronous motor of a good embodiment of the present invention. Referring to FIG. 1, the motor 100 comprises a motor shaft 3, the main mechanism 1 and the auxiliary mechanism 4 sleeved on the said motor shaft 3 in turn which work in parallel, and a motor cover 2 fixed and connected between the main mechanism 1 and the auxiliary mechanism 4. In the present invention, the motor can be used in an electric car. When the electric car starts, the main mechanism 1 and the auxiliary mechanism 4 work synchronously; when the electric car reaches a certain speed, the auxiliary mechanism 4 does not work, and only the main mechanism 1 works; and when the electric car reaches a certain speed, the auxiliary mechanism 4 works again to prepare for restarting of the electric car.

Figure 2:
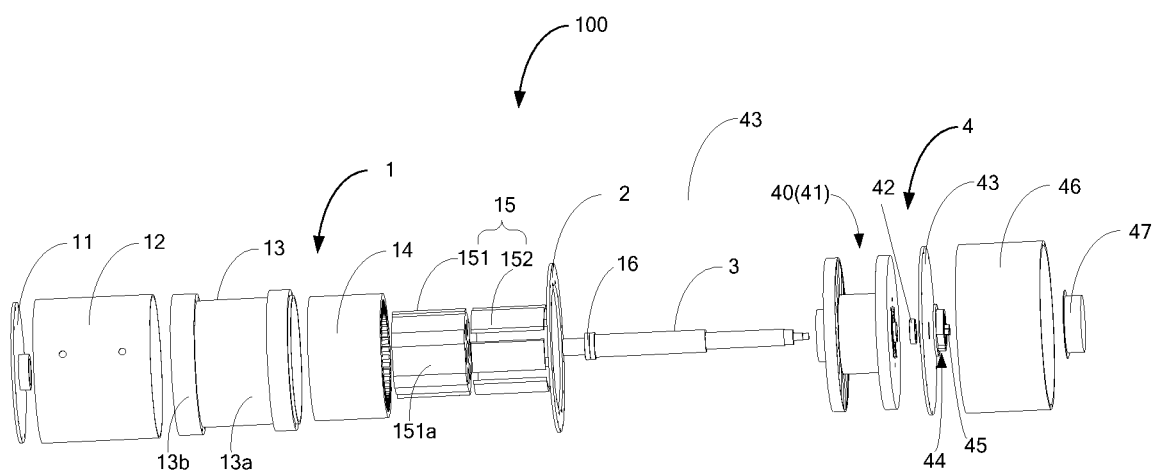
FIG. 2 illustrates an explosion diagram in FIG. 1.

FIG. 2 illustrates an explosion diagram in FIG. 1. Referring to FIG. 2, the main mechanism 1 comprises a main stator 14 and a main rotor 15. The main stator 14 is approximately a hollow cylinder, and the hollow structure is cylindrical. Several wire grooves are evenly arranged circumferentially on the inner wall of the main stator 14, and there are coils in the wire grooves. The main rotor 15 comprises an iron core 151 and the first permanent magnet group (not numbered in the picture). The iron core 151 is provided with several magnetic slots 151a, each magnetic slot 151a is evenly distributed along the axis of the said iron core 151 circumferentially at equal interval, the first permanent magnet group comprises several first permanent magnets 152 on several magnetic slots 151a installed on the iron core 151, and the two adjacent first permanent magnets 152 have different magnetic poles. Specifically, the first permanent magnet 152 is a rectangular tile. As shown in FIG. 2, correspondingly the magnetic slot 151a is also a rectangular tile. The main rotor 15 is sleeved on the second section of the motor shaft 3, the main stator 14 surrounds the main rotor 15, and the axis of the iron core 151 of the main rotor 15 coincides with that of the main stator 14 and the main rotor 15.

The main mechanism 1 also comprises the motor casing of the main stator 13 sleeved on the main stator 14 and the outer casing 12 sleeved on the motor casing of the main stator 13. The axis of the motor casing of the main stator 13 and its outer casing 12 both coincide with the axis of the main stator 14. The motor casing of the main stator 13 and its outer casing 12 are bonded together with insulating glue. The motor casing of the main stator 13 is roughly a cylinder with a hollow structure, and the hollow structure is cylindrical. The motor casing of the main stator 13 is provided with several hole slots (not shown in the picture), which are evenly distributed along the axis of the axial end face circumferentially. The cross section of the hole slot is a circular cylinder.

Further, the main mechanism 1 also comprises the first motor bearing 16 and a front cover of the motor 11. The front cover of motor 11 has a through hole in the center, whose size is same to that of the axial end face of the motor shaft 3; two parallel first motor bearings 16 are sleeved the motor shaft 3, and the front cover of the motor 11 is sleeved on the motor shaft 3 through two parallel first motor bearings 16, and fixed on and connected with the motor casing of the main stator 13. Preferably, there are several hole slots on the end face of the front cover of the motor 11, each hole slot is evenly distributed along the axis of the end face circumferentially, and the front cover of the motor 11 is connected with the motor casing of the main stator 13 through the hole slot. In this embodiment, in order to make a firm connection between the front cover of the motor 11 and the motor casing of the main stator 13 and save materials, a groove 13a is set in the central area axially on the outer wall of the motor casing of the main stator 13, so that the opposite ends of the motor casing of the main stator 13 constitute a narrow portion 13b, and the hole slot on the motor casing of the main stator 13 can pass through the narrow portion 13b. In this way, the front cover of the motor 11 can be firmly connected with the motor casing of the main stator. Correspondingly, the cross section of the hole slot on the front cover of the motor 11 is also a circular cylinder.

Of course, the cross section of the hole slot of the motor front cover 11 and the hole slot on the motor casing of the main stator 13 can be also a square cylinder.

The auxiliary mechanism 4 comprises auxiliary rotor components 40, auxiliary stator components 44, a one-way bearing body 41 and the back cover of the motor 43 fixed and connected between auxiliary rotor components 40 and auxiliary stator components 44. The one-way bearing body 41, the back cover of the motor 43 and the auxiliary stator components 44 are sleeved on the motor shaft 3 in turn. The auxiliary rotor components 40 are sleeved on the one-way bearing body 41, so that the auxiliary rotor components 40 are sleeved on the motor shaft 3 through the one-way bearing body 41. Of course, the auxiliary rotor components 40 can also be sleeved on the motor shaft 3 through an electronic coupler.

Specifically, in this embodiment, the one-way bearing body 41 comprises several one-way bearings 411, inner sleeves of one-way bearings 413 and outer sleeves of one-way bearings 412. The inner sleeve of one-way bearing 413 is roughly a cylinder with a hollow structure, and the hollow structure is cylindrical. Its outer wall is stepped, and the radius of the axial end face of the two opposite ends is smaller than that of the axial end face of the central area. The inner sleeve of one-way bearing 413 is sleeved on the motor shaft 3. At one end of the said inner sleeve of one-way bearing 413, there are two parallel one-way bearings 411, and at the other end there are two parallel one-way bearings 411. Thus, the inner sleeve of one-way bearing 413 and several one-way bearings 411 form a whole part. The outer sleeve of one-way bearing 412 surrounds the whole part, so as to form the one-way bearing body 41. Specifically, the outer sleeve of one-way bearing 412 is roughly a cylinder with a hollow structure, and the hollow structure is cylindrical. The outer walls of several one-way bearings 411 are attached to the inner walls of the one-way bearings 412. That is, the radiuses of them are the same.

In this embodiment, the back cover of motor 43 has a through hole in the center, whose size is same to that of the axial end face of the motor shaft 3; the back cover of the motor 43 passes through the motor shaft 3, and is connected with the motor shaft 3 through the second motor bearing 42.

Figure 3:
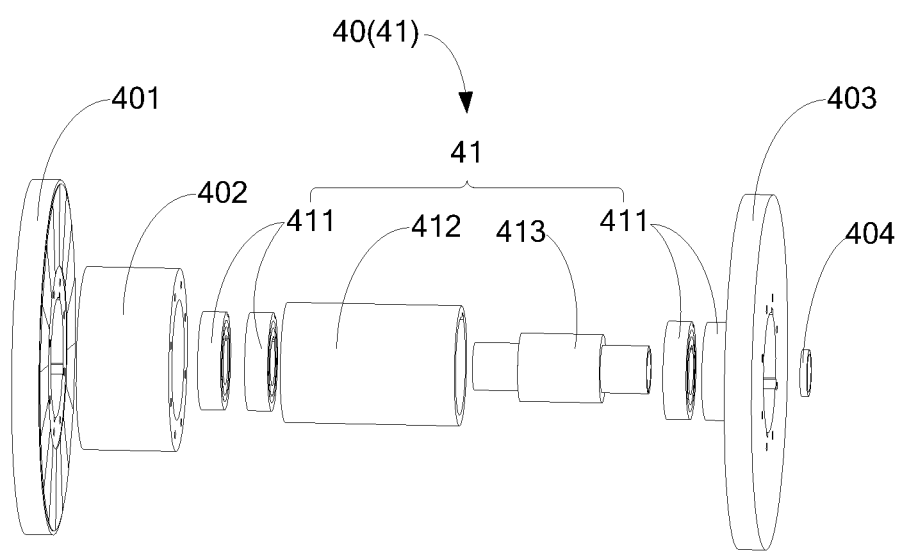
FIG. 3 illustrates a decomposition diagram of the auxiliary rotor components in FIG. 2.

FIG. 3 illustrates a decomposition diagram of the auxiliary rotor components and the one-way bearing body in FIG. 2. Referring to FIG. 3, the auxiliary rotor components 40 comprise the first auxiliary rotor 401, the second auxiliary rotor 403 and the fixing sleeve 402 on the one-way bearing body 41. The first auxiliary rotor 401 and the second auxiliary rotor 403 are sleeved on the opposite ends of the one-way bearing body 41. The inner wall of the fixing sleeve 402 is attached to the outer wall of the one-way bearing 412, and the one-way bearing body 41 and the fixing sleeve 402 are bonded together with insulating glue. Specifically, the fixing sleeve 402 is roughly a cylinder with a hollow structure, and the hollow structure is cylindrical. On the fixing sleeve 402, there are several through holes, and each through hole is evenly distributed along the axis of the axial end face circumferentially.

Figure 4A:
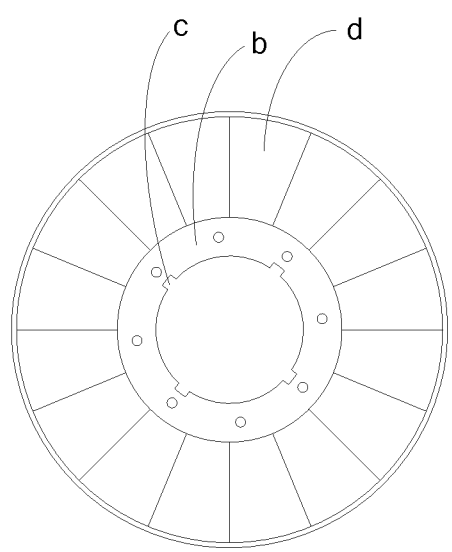
FIG. 4a illustrates a front view of the first auxiliary rotor or the second auxiliary rotor in FIG. 3.
Figure 4B:
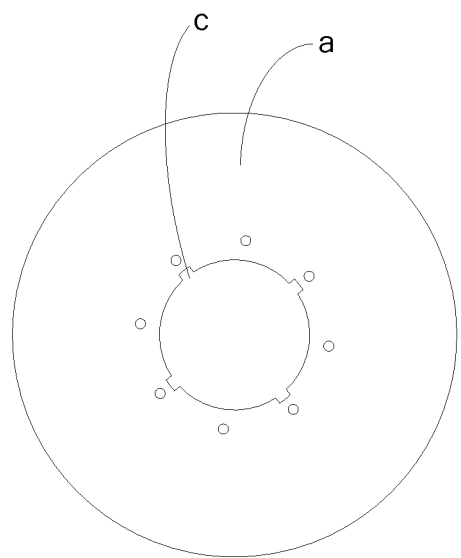
FIG. 4b illustrates a reverse diagram of the first auxiliary rotor or the second auxiliary rotor in FIG. 3.

At the same time, referring to FIG. 4, the first auxiliary rotor 401 and the second auxiliary rotor 403 are both disc-shaped. The first auxiliary rotor 401 or the second auxiliary rotor 403 both comprise a cylindrical main body a with a hollow structure and an opening on an axial end face, and the connecting part b in the center of the main body a. The connecting part b is roughly cylindrical, the inner edge of the connecting part b is provided with several concave ribs c, each concave rib c is evenly distributed along the axis of the connecting part circumferentially at equal interval; the connecting part b is provided with several through holes (not numbered in the picture), and each through hole is evenly distributed along the axis of the connecting part circumferentially at equal interval.

Further, the first auxiliary rotor 401 and the second auxiliary rotor 403 also comprise the second permanent magnet group (not numbered in the picture). The second permanent magnet group comprises several second permanent magnets d. The second permanent magnet group is set in the main body a. Every second permanent magnet d is evenly distributed along the axis of the axial end face of main body a circumferentially. Two adjacent second permanent magnets d have different magnetic poles. Thus, the second permanent magnet constitutes the axial end face of the opening of the first auxiliary rotor 401 or the second auxiliary rotor 403. Specifically, the second permanent magnet d is fan-shaped and tile-shaped.

Further, referring to FIG. 3, the first auxiliary rotor 401 and the second auxiliary rotor 403 are fixed on and connected with the opposite ends of the fixing sleeve 402, respectively. Specifically, the first auxiliary rotor 401 is fixed on and connected with one end of the fixing sleeve 402 through the through hole on the first auxiliary rotor 401 and the through hole on the fixing sleeve 402. Similarly, the second auxiliary rotor 403 is fixed on and connected with the other end of the fixing sleeve 402 through the through hole on the second auxiliary rotor 403 and the through hole on the fixing sleeve 402. And the axial end face of the opening composed of the second permanent magnet d of the first auxiliary rotor 401 is opposite to the axial end face of the opening composed of the second permanent magnet d of the second auxiliary rotor 403.

Further, the auxiliary rotor components 40 also comprise a top ring 404 for fixing the one-way bearing body 41, and the said top ring 404 is sleeved on the motor shaft 3 and arranged in parallel with the one-way bearing body 41 along the axis of the said motor shaft 3. In this way, when the motor shaft 3 rotates, the deviation of auxiliary rotor components 40 can be prevented. At the same time, it can prevent the motor shaft 3 from rotating relative to the one-way bearing body 41. Specifically, the top ring 404 is roughly a cylinder with a hollow structure, and the hollow structure is cylindrical.

Figure 5:
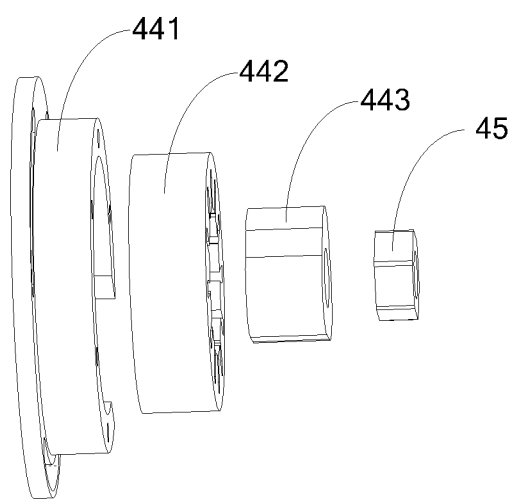
FIG. 5 illustrates a decomposition diagram of the auxiliary stator components and the hex nut in FIG. 2.

Further, at the same time, referring to FIG. 5, the auxiliary stator components 44 comprise a rotary transformer silicon steel sheet 443, an auxiliary stator 442 and a rotary transformer coil seat 441. The rotary transformer silicon steel sheet 443 is sleeved on the tail end of the motor shaft 3, the auxiliary stator is sleeved on the rotary transformer silicon steel sheet 443, and the rotary transformer coil seat 441 is sleeved in the auxiliary stator 442. And the rotary transformer coil seat 441 and the auxiliary stator 442 are fixed on and connected with the back cover of the motor 43, respectively. Thus, they constitute a rotary transformer, which is an induction micromotor whose output voltage and rotor angle maintain a certain function relationship, and a displacement sensor which converts angular displacement into electrical signal. The electrical signal is stably transmitted to the motor controller, and then the speed and torque of the motor is controlled by the controller. Specifically, the auxiliary stator 442 is a rotary transformer coil stator. It is roughly a cylinder with a hollow structure, and the hollow structure is cylindrical. Several wire grooves are evenly arranged circumferentially on the inner wall of the auxiliary stator 442; and the cross section of the rotary transformer silicon steel sheet 443 is roughly a triangular cylinder.

In this embodiment, the auxiliary mechanism 4 also comprises hex nuts 45, which are sleeved on the tail end of the motor shaft 3 and arranged in parallel with the auxiliary stator components 44 along the motor shaft 3 to fix the auxiliary stator components 44 on the motor shaft 3. In this way, the auxiliary stator components 44 can be prevented from deviating.

Further, in this embodiment, the auxiliary mechanism 4 also comprises the housing of the auxiliary motor 46 and the back cover of the rotary transformer coil 47. The housing of the auxiliary motor 46 surrounds the auxiliary rotor components 40, and its opposite ends are fixed on and connected with the middle cover of the motor 2 and the back cover of the motor 43, respectively. Preferably, the opposite ends of the housing of the auxiliary motor 46 are fixed on and connected with the middle cover of the motor 2 and the back cover of the motor 43. The housing of the auxiliary motor 46, the middle cover of the motor 2 and the back cover of the motor 43 are provided with several through holes, respectively, which are connected correspondingly. The housing of the auxiliary motor 46 is roughly a cylinder with a hollow structure, and the hollow structure is cylindrical. Its inner wall has several coils (not shown in the picture), whose front is roughly H-shaped. The coils are evenly distributed along the axis of the inner wall of the housing of the auxiliary motor 46 circumferentially. The back cover of the rotary transformer coil is located on the auxiliary stator components 44, and fixed on and connected with the back cover of the motor 43. Further, in this embodiment, the auxiliary mechanism 4 also comprises the housing of the auxiliary motor 46 and the back cover of the rotary transformer coil 47. The housing of the auxiliary motor 46 surrounds the auxiliary rotor components 40, and its opposite ends are fixed on and connected with the middle cover of the motor 2 and the back cover of the motor 43, respectively. Preferably, the opposite ends of the housing of the auxiliary motor 46 are fixed on and connected with the middle cover of the motor 2 and the back cover of the motor 43, respectively. The housing of the auxiliary motor 46, the middle cover of the motor 2 and the back cover of the motor 43 are provided with several through holes, respectively, which are connected correspondingly. The housing of the auxiliary motor 46 is roughly a cylinder with a hollow structure, and the hollow structure is cylindrical. Its inner wall has several coils (not shown in the picture), whose front is roughly H-shaped. The coils are evenly distributed along the axis of the inner wall of the housing of the auxiliary motor 46 circumferentially. The back cover of the rotary transformer coil 47 is located on the auxiliary stator components 44, and fixed on and connected with the back cover of the motor 43.

The main mechanism 1 and the auxiliary mechanism 4 are respectively sleeved on the motor shaft 3, respectively, so according to the characteristics of the main mechanism 1 and the auxiliary mechanism 4 the motor shaft 3 can be a stair-step cylinder. As shown in the figure, the axial end faces of the stair-step cylinder have different radiuses. From left to right, the radiuses of the axial end faces of the stair-step cylinder show a decreasing trend.

To sum up, the multi-rotor permanent magnet synchronous motor does not need a gear box to drive, and the energy consumption is small.

The above is only a good embodiment of the present invention, but the present invention is not limited to the specific embodiment. Enlightened by the present invention, the ordinary technical personnel in the field can also create a lot of forms without departing from the scope protected by the purpose and claim of the present invention, which are within the scope of protection of the present invention. Therefore, the protection scope of the present invention shall be based on that of the claim.

What is claimed is:

1. A multi-rotor permanent magnet synchronous motor, wherein the motor (100) comprises a motor shaft (3) and a main mechanism (1) and an auxiliary mechanism (4) sleeved on the motor shaft (3) in turn which work in parallel;
    the auxiliary mechanism (4) comprises a one-way bearing body (41) sleeved on the motor shaft (3) and auxiliary rotor components (40) sleeved on the one-way bearing body (41);
    wherein the one-way bearing body (41) comprises a plurality of one-way bearings (411), inner sleeves of one-way bearings (413) and outer sleeves of one-way bearings (412); the inner sleeves of one-way bearings (413) are sleeved on the motor shaft (3); two parallel one-way bearings (411) are provided at one end of the inner sleeve of one-way bearing (413) and two parallel one-way bearings (411) are provided at the other end of the inner sleeve of one-way bearing (413); and outer sleeve of one-way bearing (412) surrounds an entirety constituted by the plurality of one-way bearings (411) and the inner sleeve of one-way bearing (413).

2. The multi-rotor permanent magnet synchronous motor of claim 1, wherein the auxiliary rotor components (40) comprise a first auxiliary rotor (401) and a second auxiliary rotor (403), and the first auxiliary rotor (401) and the second auxiliary rotor (403) are sleeved on opposite ends of the one-way bearing body (41), respectively.

3. The multi-rotor permanent magnet synchronous motor of claim 2, wherein the first auxiliary rotor (401) and the second auxiliary rotor (403) comprise a cylindrical main body (a) with a hollow structure and an axial end face opening and a cylindrical connecting part (b) in the center of the main body (a);
    a plurality of concave ribs (c) are set at an inner edge of the said connecting part (b); each of the concave ribs (c) is evenly distributed along an axis of the connecting part (b) circumferentially at an equal interval.

4. The multi-rotor permanent magnet synchronous motor of claim 3, wherein the first auxiliary rotor (401) and the second auxiliary rotor (403) both comprise a second permanent magnet group, the second permanent magnet group comprises several a plurality of second permanent magnets (d) set in the main body (a) and constituting the axial end face of the opening of the said main body (a), each of the second permanent magnets (d) is evenly distributed along the axis of the said main body (a) circumferentially at equal interval, and the two adjacent second permanent magnets (d) have different magnetic poles.

5. The multi-rotor permanent magnet synchronous motor of claim 4, wherein the auxiliary rotor components (40) also comprise a fixing sleeve (402) used for fixing the said first auxiliary rotor (401) and the second auxiliary rotor (403); the fixing sleeve (402) is on the one-way bearing body (41); the first auxiliary rotor (401) and the second auxiliary rotor (403) are connected to opposite ends of the fixing sleeve (402) respectively; and the axial end face of the opening of the main body (a) composed of the second permanent magnet (d) of the first auxiliary rotor (401) is opposite to the axial end face of the opening of the said main body (a) composed of the second permanent magnet (d) of the second auxiliary rotor (403).

6. The multi-rotor permanent magnet synchronous motor of claim 5, wherein the second permanent magnet (d) is fan-shaped and tile-shaped.

7. The multi-rotor permanent magnet synchronous motor of claim 6, wherein the auxiliary rotor components (40) also comprise a top ring (404) for fixing the said one-way bearing body (41), and the top ring (404) is sleeved on the motor shaft (3) and arranged in parallel with the one-way bearing body (41) along the axis of the said motor shaft (3).

8. The multi-rotor permanent magnet synchronous motor of claim 7, wherein the auxiliary mechanism (4) also comprises auxiliary stator components (44) sleeved on the said motor shaft (3) and hex nuts (45) used for fixing the said auxiliary stator components (44); the said auxiliary stator components (44) comprise a rotary transformer silicon steel sheet (443), an auxiliary stator (442) sleeved on the rotary transformer silicon steel sheet (443) and a rotary transformer coil seat (441) sleeved on the auxiliary stator (442); the rotary transformer silicon steel sheet (443) is sleeved on the motor shaft (3); and the hex nuts (45) are sleeved on a tail end of the motor shaft (3), and arranged in parallel with the stator components (44) along the axis of the motor shaft (3).

9. The multi-rotor permanent magnet synchronous motor of claim 8, wherein the main mechanism (1) comprises a main rotor (15) and a main stator (14) surrounding the main rotor (15); the main rotor (15) comprises an iron core (151) and a first permanent magnet group, the iron core (151) is provided with a plurality of magnetic slots (151a), each of the magnetic slots (151a) is evenly distributed along the axis of the iron core (151) circumferentially at equal interval, the first permanent magnet group comprises a plurality of first permanent magnets (152) on the plurality of magnetic slots (151a) installed on the iron core (151), and the two adjacent first permanent magnets (152) have different magnetic poles.

* * * * *